US008058634B2

(12) United States Patent
Chen et al.

(10) Patent No.: US 8,058,634 B2
(45) Date of Patent: Nov. 15, 2011

(54) METHOD AND APPARATUS FOR DETERMINING SHEET POSITION USING INFORMATION FROM TWO DISTINCT LIGHT BEAMS EACH AT A DIFFERENT POSITION AND A DIFFERENT ANGLE

(75) Inventors: Xin Chen, Corning, NY (US); Anping Liu, Big Flats, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 339 days.

(21) Appl. No.: 12/336,098

(22) Filed: Dec. 16, 2008

(65) Prior Publication Data

US 2010/0149553 A1 Jun. 17, 2010

(51) Int. Cl.
*G01N 21/86* (2006.01)
*G06M 7/00* (2006.01)
(52) U.S. Cl. .................. 250/559.29; 250/221
(58) Field of Classification Search .......... 250/221, 250/559.23, 559.19, 559.22, 559.28, 559.4, 250/222.1, 223 R, 559.29; 356/376, 371, 356/377, 635, 601–608, 625, 627, 638; 382/154, 382/108
See application file for complete search history.

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 3,917,414 A * | 11/1975 | Geis et al. | 356/431 |
| 4,567,347 A * | 1/1986 | Ito et al. | 219/124.34 |
| 4,673,817 A * | 6/1987 | Oomen | 250/559.23 |
| 5,193,120 A | 3/1993 | Gamache et al. | 382/1 |
| 5,298,974 A * | 3/1994 | Chandley | 356/613 |
| 6,044,170 A * | 3/2000 | Migdal et al. | 382/154 |
| 6,211,488 B1 | 4/2001 | Hoekstra et al. | 219/121.72 |

(Continued)

FOREIGN PATENT DOCUMENTS

WO WO2007/018902 2/2007

OTHER PUBLICATIONS

Corning Incorporated U.S. Appl. No. 11/983,464, filed Nov. 11, 2007.
Microtrack II™ Instruments product brochure.

*Primary Examiner* — Que T Le
*Assistant Examiner* — Jennifer Bennett
(74) *Attorney, Agent, or Firm* — Bruce P. Watson

(57) ABSTRACT

A method for determining a position of a selected area of a sheet of material relative to a reference plane includes launching a first incident light beam at the selected area of the sheet of material such that the first incident light beam strikes the selected area at a first position and a first angle, thereby producing a first reflected light beam. A second incident light beam is launched at the selected area of the sheet of material such that the second incident light beam strikes the selected area at a second position and a second angle, thereby producing a second reflected light beam. The second position and second angle are different from the first position and first angle, respectively. The first reflected light beam and the second reflected light beam are intercepted at the reference plane. Information related to positions at which the reflected light beams were intercepted and angles at which the incident light beams were launched were received and correlated to the position of the selected area relative to the reference plane.

20 Claims, 6 Drawing Sheets

U.S. PATENT DOCUMENTS

| | | |
|---|---|---|
| 6,891,148 B1 * | 5/2005 | Rivera et al. .................. 250/221 |
| 7,225,665 B2 * | 6/2007 | Goforth et al. .................. 73/105 |
| 7,551,274 B1 * | 6/2009 | Wornson et al. ........... 356/239.1 |
| 2005/0285024 A1 * | 12/2005 | Eubelen ........................ 250/221 |
| 2006/0261118 A1 | 11/2006 | Cox et al. ........................ 225/96 |
| 2007/0039990 A1 | 2/2007 | Kemmerer et al. ............... 225/2 |

* cited by examiner

METHOD AND APPARATUS FOR DETERMINING SHEET POSITION USING INFORMATION FROM TWO DISTINCT LIGHT BEAMS EACH AT A DIFFERENT POSITION AND A DIFFERENT ANGLE

TECHNICAL FIELD

The invention relates generally to production and handling of large-sized sheets made of glass-based material. More particularly, the invention relates to a method and apparatus for measuring position of a selected area of a sheet of material during production and handling of the sheet.

BACKGROUND

Fusion draw process is used to make a sheet of material from molten material, such as molten glass. The general fusion draw process is described in U.S. Pat. Nos. 3,338,696 and 3,682,609, both issued to Dockerty. Typically, the fusion draw process involves delivering molten material into a trough and overflowing the molten material down the sides of the trough in a controlled manner. The separate streams of material flowing down the sides of the trough merge at the root of the trough into a single stream of material, which is drawn into a continuous sheet of material. The continuous sheet of material is separated into discrete pieces at the bottom of the fusion draw machine. A key advantage of this process is that the surfaces of the sheet of material do not come in contact with the sides of the trough or other forming equipment and therefore are pristine. Another benefit of the process is that the sheet of material is very flat and has a uniform thickness.

Large sheets of glass produced by fusion draw process are a key component in making large flat panel displays. Alternatively, they can be diced to make other devices such as active electronic devices, photovoltaic devices, and biological arrays. However, as the demand for even larger sheets of material increases, so does the difficulty in producing and handling of these sheets. For example, sheet scoring and separation processes at the bottom of the fusion draw machine (FDM) contribute significantly to the sheet motion in the forming zone of the FDM. Sheet motion in the forming zone can negatively impact the level of stress and stress variation within the sheet, possibly leading to distortion in the final product. The larger the sheet being handled, the more significant the effect of sheet motion can be on the stress level and variation with the sheet.

Corning Incorporated, the assignee of the present invention, has developed various techniques for minimizing sheet motion at the bottom of the draw. One such technique involves scoring the glass sheet by laser, thereby avoiding physical contact with the glass sheet that can result in sheet motion, as described in U.S. patent application Ser. No. 12/008,949. Another technique involves use of a conformable nosing device to engage a glass sheet while the glass sheet is being scored, thereby reducing motion of the glass sheet during scoring, as described in U.S. patent application Publication No, US2008/0276646. Another technique involves separation of the glass sheet without bending the glass sheet, as described in U.S. Patent Application Publication No. US2007/0039990. These techniques require real-time information about the position of selected areas of the glass sheet relative to a reference plane. Such information at different elevations of the FDM is also useful in fine-tuning and optimizing the draw process.

SUMMARY

In a first aspect of the invention, a method for determining a position of a selected area of a sheet of material relative to a reference plane is provided. The method comprises launching a first incident light beam at the selected area of the sheet of material such that the first incident light beam strikes the selected area at a first position and a first angle, thereby producing a first reflected light beam. The method includes launching a second incident light beam at the selected area of the sheet of material such that the second incident light beam strikes the selected area at a second position and a second angle, thereby producing a second reflected light beam, where the second position and second angle are different from the first position and first angle, respectively. The method includes intercepting the first reflected light beam and the second reflected light beam at the reference plane. The method includes receiving information related to positions at which the reflected light beams were intercepted and angles at which the incident light beams were launched. The method includes correlating the information to the position of the selected area from the reference plane.

In certain embodiments of the first aspect of the invention, the method further includes using the information to control a no-bend sheet separation process.

In certain embodiments of the first aspect of the invention, correlating the information comprises determining a distance between the selected area and the reference plane and an orientation of the selected area relative to the reference plane from the information.

In certain embodiments of the first aspect of the invention, correlating the information comprises resolving $P_n = b(2\theta_n + \theta_0)$, where $P_n$ is the location at which the reflected beams are intercepted on the reference plane, $\theta_n$ is the angle at which the incident light beams strike the selected area, b is the distance from the selected area to the reference plane, and $\theta_0$ is the orientation of the selected area relative to the reference plane.

In certain embodiments of the first aspect of the invention, the absolute value of each of $\theta_n$ and $\theta_0$ is less than approximately 12 degrees.

In certain embodiments of the first aspect of the invention, the first incident light beam and the second incident light beam are elongated light beams.

In certain embodiments of the first aspect of the invention, launching the first incident light beam and the second incident light beam includes aligning a major axis of the first incident light beam and a major axis of the second incident light beam, respectively, in a direction substantially parallel to a translation direction of the sheet of material.

In certain embodiments of the first aspect of the invention, the method further includes generating a light beam and splitting the light beam into the first incident light beam and the second incident light beam.

In certain embodiments of the first aspect of the invention, the method further includes generating a light beam and directing the light beam at a scanning optical mirror to produce the first incident light beam and the second incident light beam.

In certain embodiments of the first aspect of the invention, the scanning mirror is positioned in opposing relation to the selected area and rotates along a translation direction of the sheet of material.

In certain embodiments of the first aspect of the invention, the method further includes generating the first incident light beam with a first light source and the second incident light beam with a second light source.

In certain embodiments of the first aspect of the invention, intercepting the first reflected light beam and the second reflected light beam comprises intercepting the first reflected light beam with a linear array detector.

In certain embodiments of the first aspect of the invention, intercepting the first reflected light beam and the second reflected light beam includes selectively translating a light receiver to intercept the first reflected light beam and the second reflected light beam.

In certain embodiments of the first aspect of the invention, intercepting the first reflected light beam and the second reflected light beam includes intercepting the first reflected light beam prior to launching the second incident light beam.

In a second aspect of the invention, an apparatus for determining a position of a selected area of a sheet of material relative to a reference plane is provided. The apparatus comprises a light source for launching a first incident light beam and a second incident light beam at the selected area of the sheet of material at a first angle and a second angle, respectively, said first angle being different from the second angle. The apparatus includes a light receiver for intercepting a first reflected light beam and a second reflected light beam from the selected area of the sheet of material, where the first reflected light beam and the second reflected light beam travels in different optical paths. The apparatus includes a data collector for collecting information about positions at which the reflected light beams were intercepted and angles at which the incident light beams were launched. The apparatus includes a data analyzer for determining the position of the selected area relative to the reference plane from the collected data.

In certain embodiments of the second aspect of the invention, the light source comprises a light generator operating at a wavelength ranging from 400 nm to 1700 nm.

In certain embodiments of the second aspect of the invention, the light source further comprises a scanning optical mirror positioned to receive a light beam from the light generator.

In certain embodiments of the second aspect of the invention, the light source further comprises a beam shaper for shaping a light beam from the light generator into an elongated light beam having an aspect ratio of at least 10.

In certain embodiments of the second aspect of the invention, the light source further includes a beam splitter for splitting a light beam from the light generator into the first incident light beam and the second incident light beam.

In certain embodiments of the second aspect of the invention, the light source includes a first light generator for providing the first incident light beam and a second light generator for providing the second incident light beam.

In certain embodiments of the second aspect of the invention, the light receiver comprises an array of detectors for intercepting the reflected light beams.

In certain embodiments of the second aspect of the invention, the data analyzer resolves $P_n = b(2\theta_n + 2\theta_0)$, where $P_n$ is the location at which the reflected beams are intercepted on the reference plane, $\theta_n$ is the angle at which the incident light beams strike the selected area, b is the distance from the selected area to the reference plane, and $\theta_0$ is the orientation of the selected area relative to the reference plane.

In a third aspect of the invention, a glass-sheet manufacturing system is provided. The glass-sheet manufacturing system comprises a fusion draw machine for forming a sheet of material and an apparatus for determining a position of a selected area of the sheet of material relative to the reference plane as described in the second aspect of the invention.

Other features and advantages of the invention will be apparent from the following description and the appended claims.

BRIEF DESCRIPTION OF THE DRAWINGS

The following is a description of the accompanying drawings. In the drawings, the figures are not necessarily to scale, and certain features and certain views of the figures may be shown exaggerated in scale or in schematic in the interest of clarity and conciseness.

DETAILED DESCRIPTION

Figure 1:
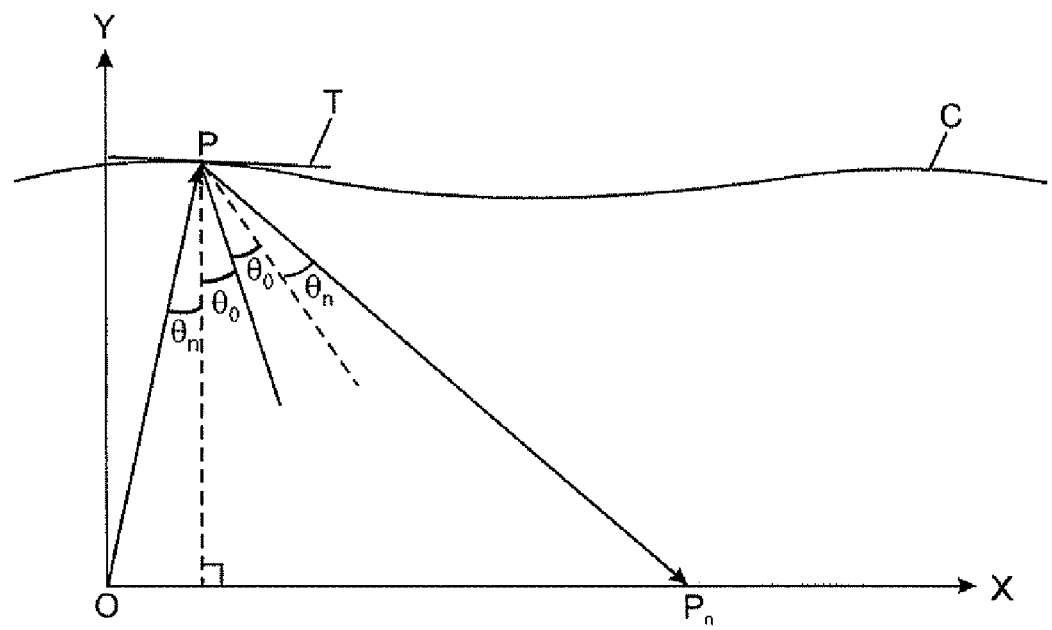
FIG. 1 illustrates a method of measuring a position of a selected area on a sheet of material relative to a reference plane.

The invention will now be described in detail with reference to a few exemplary embodiments, as illustrated in the accompanying drawings. In describing the exemplary embodiments, numerous specific details may be set forth in order to provide a thorough understanding of the invention. However, it will be apparent to one skilled in the art that the invention may be practiced without some or all of these specific details. In other instances, well-known features and/or processes may not be described in detail so as not to unnecessarily obscure the invention. In addition, like or identical reference numerals may be used to identify common or similar elements.

FIG. 1 illustrates a method of measuring a position of a selected area on a sheet of material relative to a reference plane. The sheet of material may, in some examples, be made of glass or glass-based material. The reference plane may be a measurement plane in which reflected beams from the sheet of material are intercepted, as will be described below. Alternately, the reference plane may be substantially parallel to a measurement plane in which reflected beams from the sheet of material are intercepted. In FIG. 1, curve C represents the sheet and P represents a point on curve C. Further, O represents a point at which source light beams are launched at the sheet and $P_n$ represents a point at which reflected light beams from the sheet are intercepted, where the reflected light beams are produced when the source light beams strike the sheet. Apparatus for launching source light beams and intercepting reflected light beams will be described below. The initial beam OP can be described as follows:

$$y = kx \quad (1)$$

where $$k = \cot \theta_n \quad (2)$$

For a large sheet (e.g., a sheet having a width >2 m in x direction), the local area around point P is essentially flat. Thus, it is adequate to use a straight line to describe the cross-section of the sheet in the local area around point P. In one example, a tangent line T to curve C at point P is selected as the straight line and can be expressed as:

$$y = ax + b \quad (3)$$

where a is the slope of the tangent line T, and b is the intercept of the tangent line T on the y-axis. Slope a can be expressed as follows:

$$a = \tan\theta_0 \quad (4)$$

From equation (3), $$x = \frac{b}{k - a} \quad (5)$$

The location of $P_n$ can be found using $$P_n = \frac{b}{k-a} + \frac{bk}{k-a}\tan(2\theta_0 + \theta_n) \quad (6)$$

Combining equations (2), (4), and (6) yields:

$$P_n = \frac{b}{\cot\theta_n - \tan\theta_0}[1 + \cot\theta_n \tan(2\theta_0 + \theta_n)] \quad (7)$$

The parameters b and $\theta_0$ are unknown and are to be measured, as will be described below. For a relatively flat sheet, $\theta_0$ is sufficiently small, e.g., less than 12°, preferably less than 5°, and more preferably less than 3°, so that b can be approximated as the distance between P and the x-axis. The parameter $\theta_0$ represents the orientation of the curve C at the selected area relative to the x-axis (reference plane).

If $\theta_0$ and $\theta_n$ are chosen to be small, for example less than 12°, preferably less than 5°, under Taylor's approximation, equation (7) can be further simplified without loss of accuracy as follows:

$$P_n = b(2\theta_n + 2\theta_0) \quad (8)$$

Mathematically, only two data sets $((P_1, \theta_1), (P_2, \theta_2))$ are needed to find b and $\theta_0$. If reflected light beams from the sheet are intercepted at two distinct positions $x_1$ and $x_2$ so that angles $\theta_1$ and $\theta_2$ related to points $P_1$ and $P_2$, respectively, are obtained, then b can be simplified as follows:

$$b = x_0/(\theta_1 - \theta_2) \quad (9)$$

and $\theta_0$ becomes:

$$\theta_0 = -\frac{1}{2}(\theta_1 + \theta_2) \quad (10)$$

Figure 2:
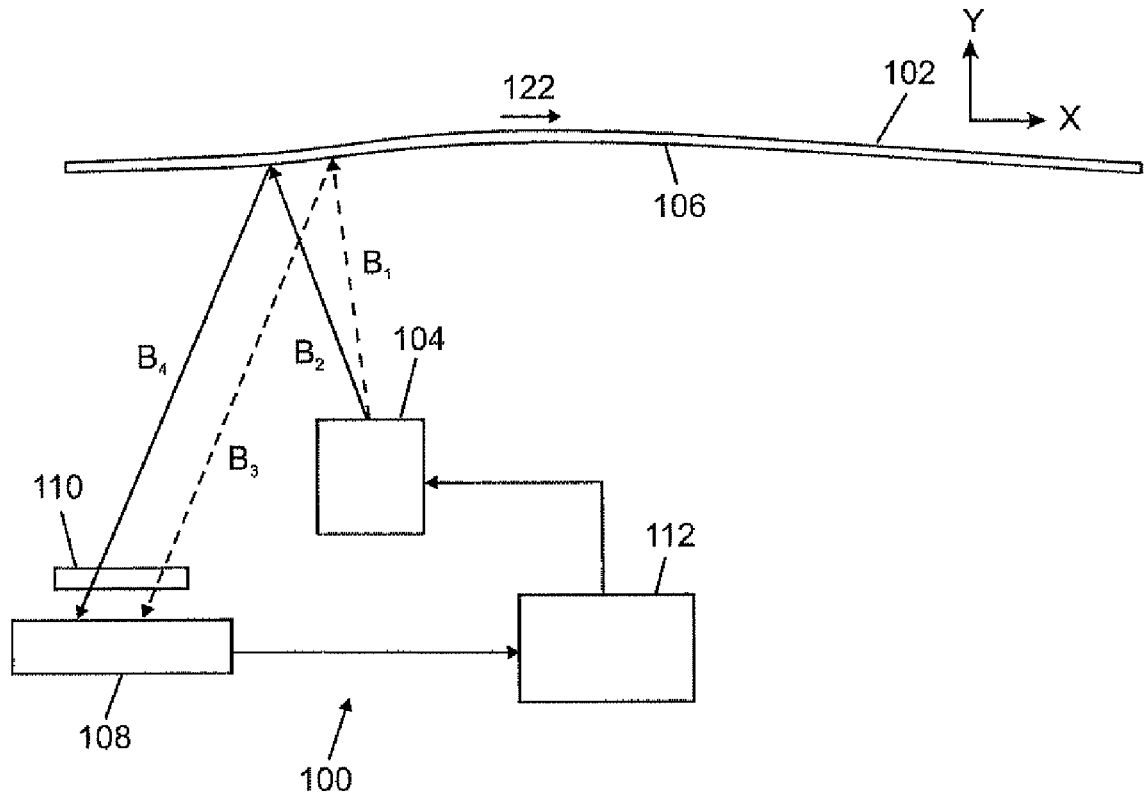
FIG. 2 is a block diagram of an apparatus for measuring a position of a selected area on a sheet of material relative to a reference plane.

FIG. 2 is a block diagram of an apparatus 100 for use in the measurement scheme described above. Apparatus 100 includes a light source 104, which provides at least two distinct incident light beams ($B_1$, $B_2$) that strike a surface 106 of the sheet 102 at a selected area of the sheet 102. The incident light beams ($B_1$, $B_2$) are distinct in that they strike the surface 106 at different positions on the surface 106 and at different incidence angles. Typically, the incident light beams ($B_1$, $B_2$) are launched at the surface 106 separately, but from the same position for the light source 104 for a given measurement. Typically, the incident light beams ($B_1$, $B_2$) are launched at the surface 106 from a short distance, e.g., between 300 mm and 1000 mm from the surface 106. The incident light beams ($B_1$, $B_2$) upon striking the surface 106 produce reflected light beams ($B_3$, $B_4$), which are directed away from the surface 106. For the measurement scheme described above, the surface 106 of the sheet of material is preferably optically smooth with minimal scattering.

Apparatus 100 includes a light receiver 108, which intercepts the reflected light beams ($B_3$, $B_4$) from the surface 106. The reflected light beams ($B_3$, $B_4$) may pass through a narrow band pass filter 110 prior to being intercepted by the light receiver 108, where the narrow band pass filter 110 removes or reduces unwanted noise, e.g., due to background lighting, from the reflected light beams ($B_3$, $B_4$), thereby improving the quality of measurements made by the light receiver 108.

Apparatus 100 includes a data acquisition system 112, which receives reflected beam data from the light receiver 108. Data acquisition system 112 may also receive launch angle data from the light source 104. Data acquisition system 112 processes the reflected beam and angle data (collectively referred to as "measurement data") to determine the position of a selected area of the sheet 102, as will be described below. The data acquisition system 112 may also send command signals to the light source 104 in order to control when the light source 104 launches the source light beams (B1, B2) at the surface 106 and at what angle.

Figure 3:
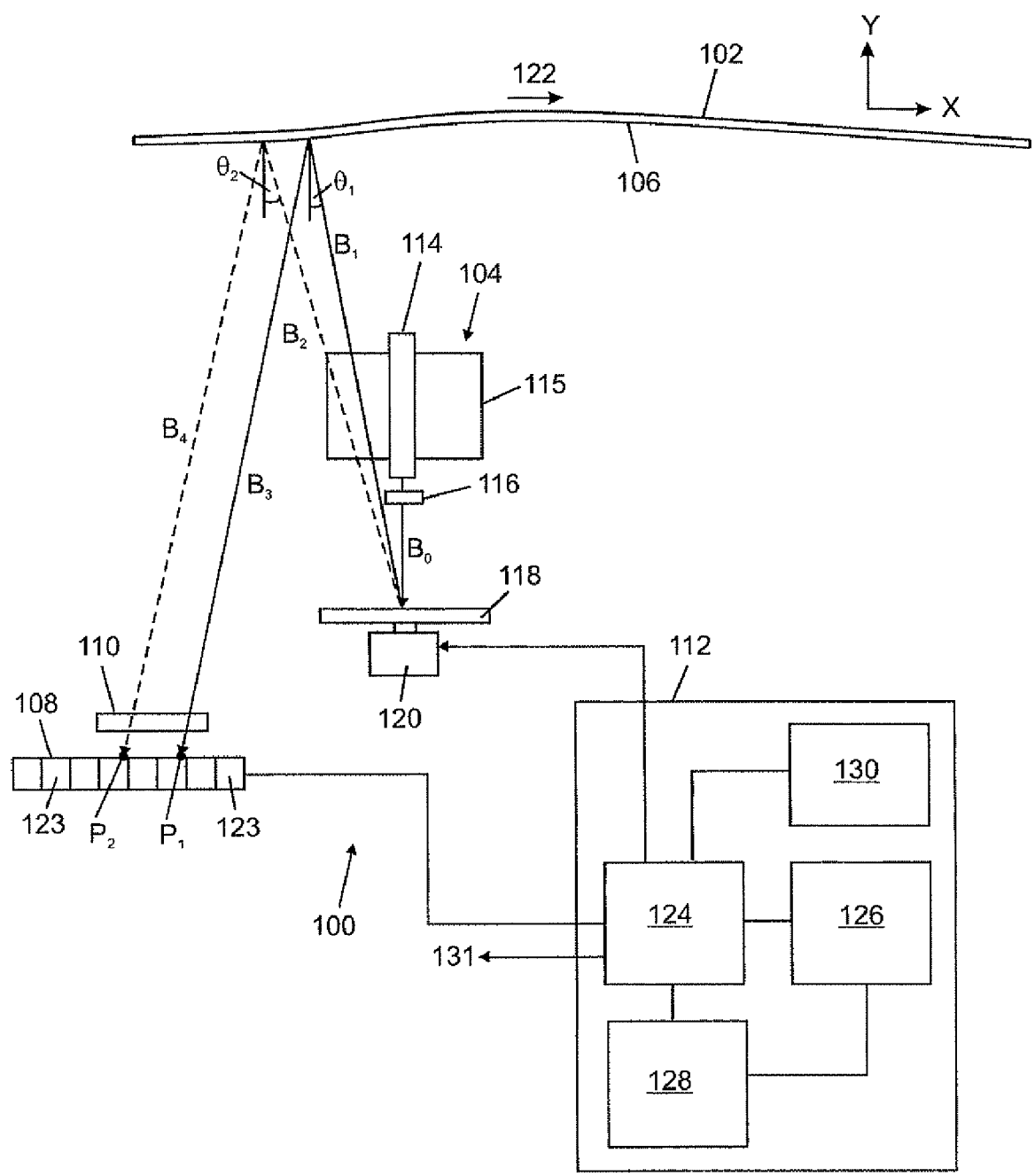
FIG. 3 is a first detailed block diagram of the apparatus of FIG. 2.

FIG. 3 is a more detailed view of apparatus 100. In FIG. 3, light source 104 includes a light generator 114, which may be mounted on a suitable stage 115. Light generator 114 may be in the vicinity of the sheet 102, as shown, or may be in a remote location with appropriate passive components, e.g., lenses, mirrors, and/or optical fibers to port a light beam from the light generator 114 to the vicinity of sheet 102. In a non-limiting example, light generator 114 is a laser diode, e.g., a collimated laser diode or fiber-coupled laser diode. Light generator 114 can be other light emitting sources, such as a superluminescent diode (SLD), a light emitting diode (LED), a He—Ne laser, or other laser sources. Light source 104 may include a lens (not shown) for collimating the beam produced by the laser diode into a circular beam if the laser diode does not provide a collimated beam. In some examples, the light generator 114 generates a light beam at a wavelength between 400 nm and 1600 nm. Light source 104 may include a beam shaper 116 for converting the light beam generated by the light generator 114 into an elongated beam, e.g., a substantially linear beam, an elliptical beam, a rectangular beam, and variations thereof. In some examples, the aspect ratio of the elongated beam is at least 10, preferably 50, more preferably 100. The size of the beam produced may be in a range of hundreds of microns to several millimeters in the minor axis.

In some examples, the beam shaper 116 is an optical diffuser with a special microstructure on its surface that redirects an input beam by changing the phase of each segment of the beam, such as available from MEMS Optical Inc., Huntsville, Ala. The structures that make a diffuser work are called scatter centers. These are the elementary surface units that direct incoming light rays into different directions. The clustering of millions of scatter centers over a large area combines to provide the scattering properties of the diffuser. The typical scatter center is a microlens element. To achieve greater than 90% conversion efficiency each scatter center is individually designed to implement a certain light-control task. When the surface structure as well as the statistical distribution of scatter centers is carefully designed and fabricated, a circular beam can be converted to an elongated beam, as described above. The beam shaper can be a cylindrical lens that changes light beam size in only one direction while keeping light beam size in another direction unchanged. When it is needed, two or more cylindrical lenses can be used to shape the beam size on the glass sheet. In this case, cylindrical lenses are mounted along two perpendicular directions so that they can independently control beam sizes in two perpendicular directions to achieve a desirable beam shape.

In the example shown in FIG. 3, light source 104 further includes a scanning optical mirror 118 driven by an actuator 120, e.g., a rotation motor, a piezo-electric actuator, or a MEMS (Micro-Electro-Electrical System). Such scanning optical mirrors are commercially available. The rotary speed of the scanning optical mirror 118 in some examples is greater than 10 Hz. The rotary speed of the scanning optical mirror 118 in other examples is greater than 10 kHz. The rotary speed of the scanning optical mirror 118 in other examples is greater than 100 KHz. The light generator 114 provides a source light beam $B_0$, which is directed at the scanning optical mirror 118. The scanning optical mirror 118 in turn redirects the source light beam $B_0$ to the sheet surface 106 as incident light beam ($B_1$, $B_2$). The position and incidence angle of the incident light beam ($B_1$, $B_2$) at the sheet surface 106 depends on the orientation (launch angle) of the scanning optical mirror 118 relative to the sheet surface 106. The scanning optical mirror 118 is positioned relative to the sheet surface 106 such that the major axis of the incident light beam ($B_1$, $B_2$) is aligned substantially parallel with the translation direction of the sheet 102—the translation direction is indicated by arrow 122.

Data acquisition system 112 may include an input/output interface 124 for communication with other components of apparatus 100, such as the light receiver 108 and light source 104, and other systems, e.g., a sheet separation system. Data acquisition system 112 may further include a data collector 126, e.g., a storage device, for storing measurement data, as explained above. Data acquisition system 112 may include a data analyzer 128, e.g., a processor, which executes instructions related to processing of the measurement data. Data analyzer 128 may analyze the measurement data to obtain b and $\theta_0$, as described above. Data analyzer 128 may preprocess the measurement data (especially, the reflected beam data), e.g., to remove unwanted noise, prior to analyzing the data to obtain b and $\theta_0$. Data acquisition system 112 may include a controller 130, which may be used to send command signals to the light source 104, as will be described below. Arrow 131 shows that data, e.g., b and $\theta_0$, can be exported from data acquisition system 112 to any system that requires the data, as will be explained below. Alternatively, calculated data can be stored in the data acquisition system 112 or displayed on a suitable device (not shown), e.g., a monitor.

Light receiver 108 may be a linear detector array having a plurality of light detector elements 123 for intercepting reflected light beams at different positions. On the other hand, light receiver 108 may be a single light detector mounted on a translation stage (single light detector and translation not shown) and which has to be translated in order to intercept reflected beams at different positions.

In a practical implementation of the measurement scheme described above, controller 130 sends a signal to the light source 104 to launch incident light beam ($B_1$) at the surface 106 of the sheet 102 at an angle $\theta_1$. The incident light beam ($B_1$) produces reflected light beam ($B_3$) upon striking the surface 106 of the sheet 102, and the light receiver 108 intercepts the reflected light beam ($B_3$) at position $P_1$. Position $P_1$ and incidence angle $\theta_1$ (i.e., measurement data) are recorded by the data acquisition system 112. Next, controller 130 sends a signal to the light source 104 to launch incident light beam ($B_2$) at the surface 106 of the sheet 102 at an angle $\theta_2$, which is different from $\theta_1$. The incident light beam ($B_2$) produces reflected light beam ($B_4$) upon striking the surface 106 of the sheet 102, and the light receiver 108 intercepts the reflected light beam ($B_4$) at position $P_2$, which is different from $P_1$. Position $P_2$ and incidence angle $\theta_2$ (measurement data) are recorded by the data acquisition system 112. The data analyzer 128 calculates b and $\theta_0$ from the measurement data using the scheme described above with reference to FIG. 1. Additional measurement data can be recorded by launching additional incident light beams at the surface 106 of the sheet 102 and intercepting reflected light beams produced by these additional incident light beams.

Figure 4:
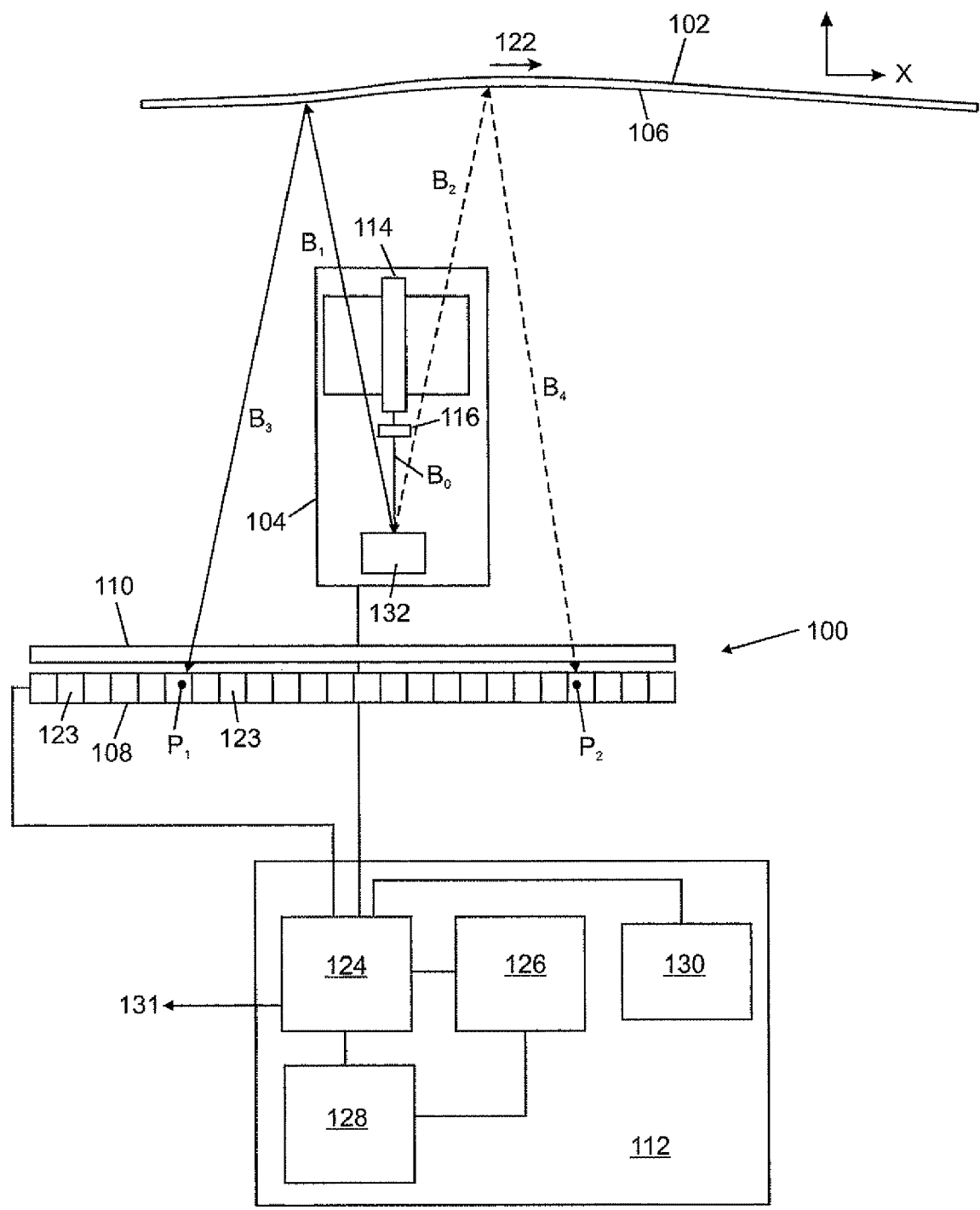
FIG. 4 is a second detailed block diagram of the apparatus of FIG. 2.

FIG. 4 is another more detailed view of apparatus 100. In FIG. 4, light source 104 includes light generator 114 (described above) for generating source light beam ($B_0$). Light source 104 further includes a beam splitter 132 for splitting source light beam ($B_0$) into incident light beams ($B_1$, $B_2$). It should be noted that beam splitter 132 replaces the scanning optical mirror (118 in FIG. 3) described above. The beam splitter 132 is positioned relative to the surface 106 of the sheet 102 such that the incident light beams ($B_1$, $B_2$) strike the surface 106 at different positions and different angles. The incident light beams ($B_1$, $B_2$) may be elongated beams as described above, with their major axes substantially aligned with the translation direction of the sheet 102—the translation direction is indicated by arrow 122. The incident light beams ($B_1$, $B_2$) produce reflected light beams ($B_3$, $B_4$). In the example shown in FIG. 4, the light receiver 108 (described above) intercepts the reflected light beams ($B_3$, $B_4$), and the data acquisition system 112 records measurement data and makes computations as described above.

Figure 5:
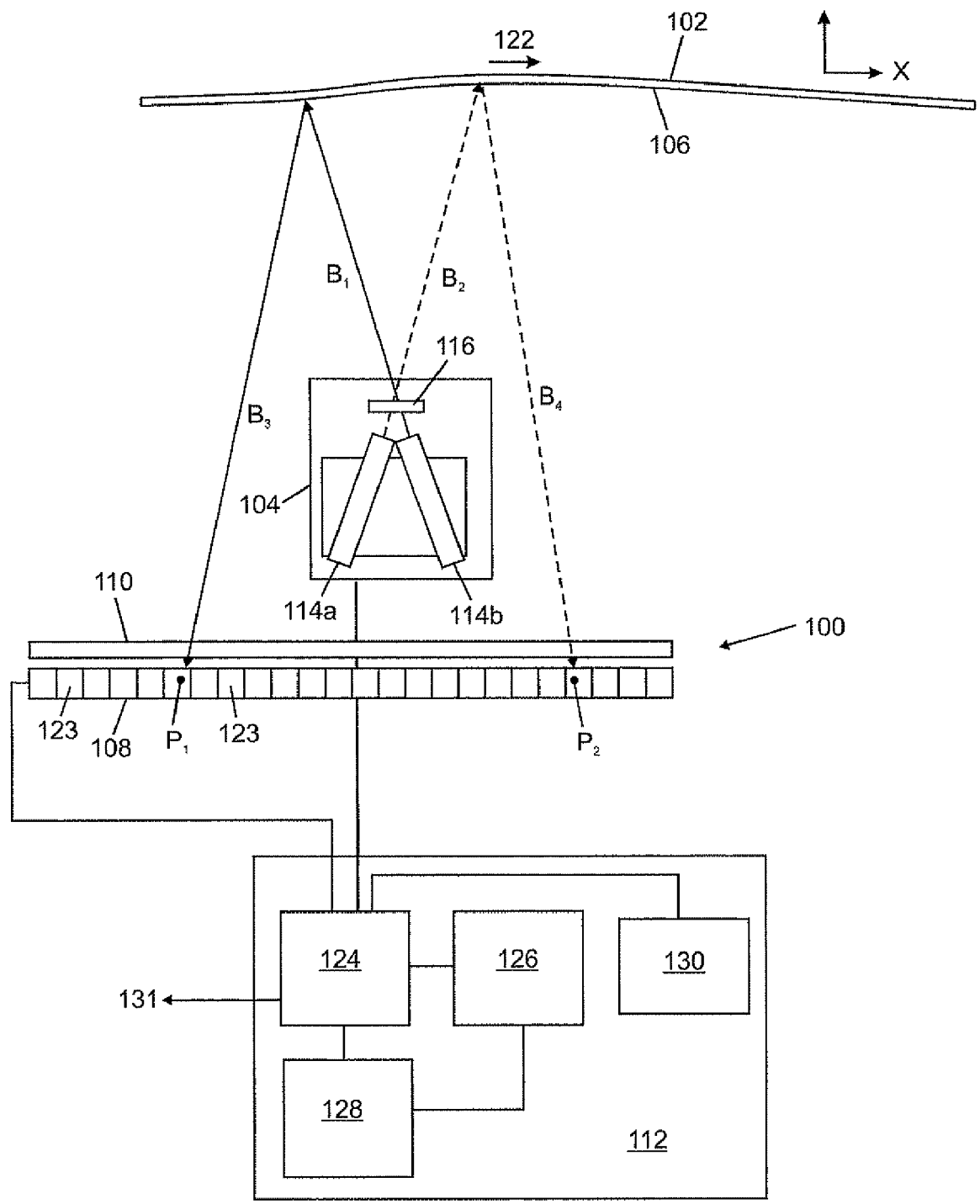
FIG. 5 is a third detailed block diagram of the apparatus of FIG. 2.

FIG. 5 is another more detailed example of apparatus 100. In FIG. 5, light source 104 includes two light generators 114a, 114b (each similar to light generator 114 in FIG. 3) for producing incident light beams ($B_1$, $B_2$). The light generators 114a, 114b are oriented relative to the surface 106 of the sheet 102 such that the incident light beams ($B_1$, $B_2$) strike the surface 106 of the sheet 102 at different positions and incidence angles. It should be noted that there is no need for a scanning optical mirror or beam splitter in this example. The incident light beams ($B_1$, $B_2$) may be elongated beams as described above, with their major axes substantially aligned with the translation direction of the sheet 102—the translation direction is indicated by arrow 122. The incident light beams ($B_1$, $B_2$) produce reflected light beams ($B_3$, $B_4$). In the example shown in FIG. 5, the light receiver 108 (as described above) intercepts the reflected light beams ($B_3$, $B_4$); the data acquisition system 112 records measurement data and makes computations as described above.

Figure 6:
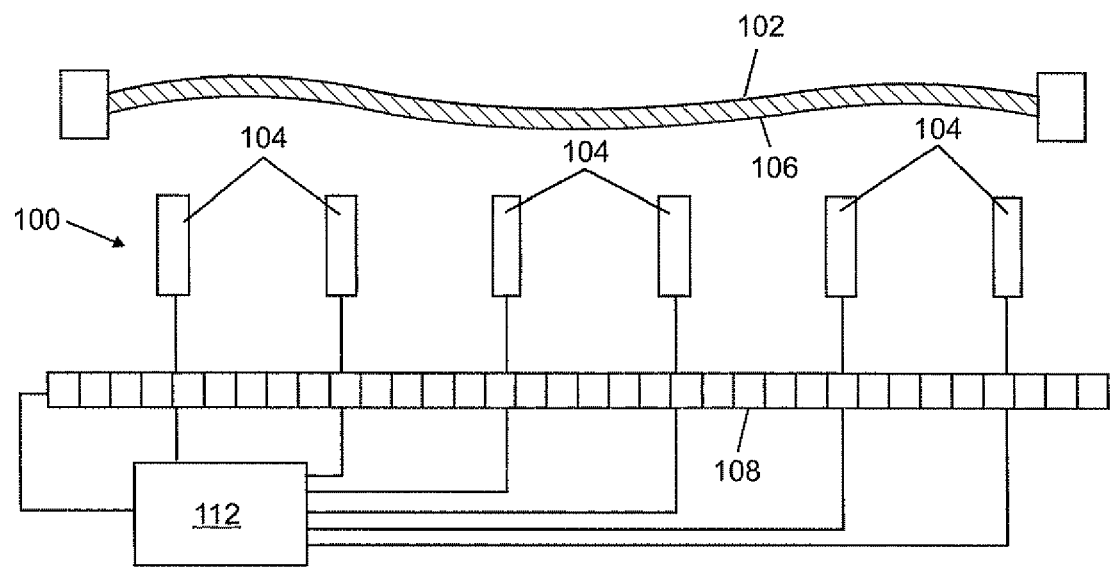
FIG. 6 depicts multiple measurement units deployed along a sheet for measuring a shape profile of the sheet.

The measurement scheme described above can be applied anywhere along the sheet 102. In one example, several measurements are made at several locations on the sheet 102 to obtain a set of b and $\theta_0$ that is used to construct a shape profile of the sheet 102. As illustrated in FIG. 6, a simple approach to making several measurements for the purpose of constructing a shape profile of the sheet would include deploying a plurality of light sources 104 across the desired portion of the sheet 102 to be profiled. Instead of associating a light receiver with each light source 104, a single light receiver 108 (as described above) may be provided to intercept reflected light beams from the sheet 102. Alternatively, one light receiver can be associated with each light source (the light receivers for each light source are not shown). The light receiver 108 should be long enough to intercept any reflected light beams from the sheet 102. The light receiver 108 communicates with the data acquisition system 112 as explained above, and the data acquisition system 112 in turn communicates with the light sources 104 to coordinate making of measurements. In the example shown in FIG. 6, the light sources 104 would launch incident light beams sequentially at the surface 106 of sheet 102. After each light source 104 launches incident light beams, measurement data are collected as described above. From the measurement data, a set of b and $\theta_0$ can be determined. A curve fit can be made to the set of b and $\theta_0$ to determine the shape profile of the sheet.

The measurement scheme and apparatus described above can enable several sheet motion reduction technologies in display sheet manufacturing processes, such as laser scoring, conformable nosing, and no-bend separation, by providing online sheet position data. The sheet position data can be collected at various elevations over time and used to fine-tune and optimize the draw process.

For illustration purposes, apparatus 100 is used in conjunction with a no-bend separation of a glass sheet. No-bend separation is described in U.S. Patent Application Publication No. US2007/0039990, the disclosure of which is incorporated herein by reference. A no-bend separation process involves forming a score line in the glass sheet, followed by applying impact energy from a vibrating tip to initiate a crack and propagate the crack along the score line. Typically, the impact energy is applied in the local region of the score line on a side of the material opposite the score line so that the stresses generated by the impact energy cause tension in the material at the score line for optimal crack propagation. The process substantially reduces movement of the sheet in a direction perpendicular to the sheet and makes the separation process well-controlled.

Figure 7:
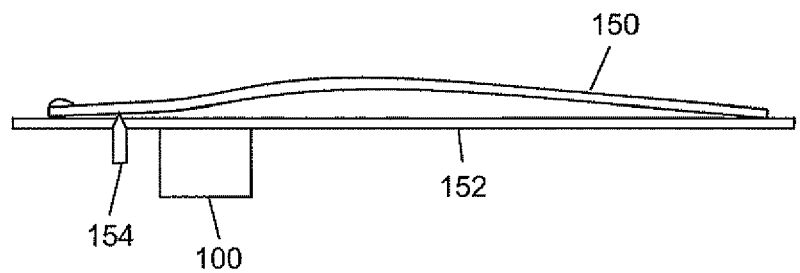
FIG. 7 depicts a no-bend glass sheet separation process.

FIG. 7 is a schematic of a no-bend station, in which a glass sheet 150 is engaged by a nosing structure 152, and a vibration probe 154 applies impact energy on the opposite of the previously scored sheet. With an ultrasonic vibration probe 154, the impact energy applied to the sheet 150 is directly dependent on the distance between the sheet 150 and the probe 154. Therefore, it is highly desirable to measure the distance and use the distance information to determine the probe position relative to the sheet in order to apply adequate impact energy. For this particular case, only one apparatus 100 is needed to measure the distance. Apparatus 100 (or the measurement parts of apparatus 100) can be mounted on the nosing structure 152 close to the vibration probe 154 to measure the distance in real time. The details of apparatus 100 are as described above.

Figure 8:
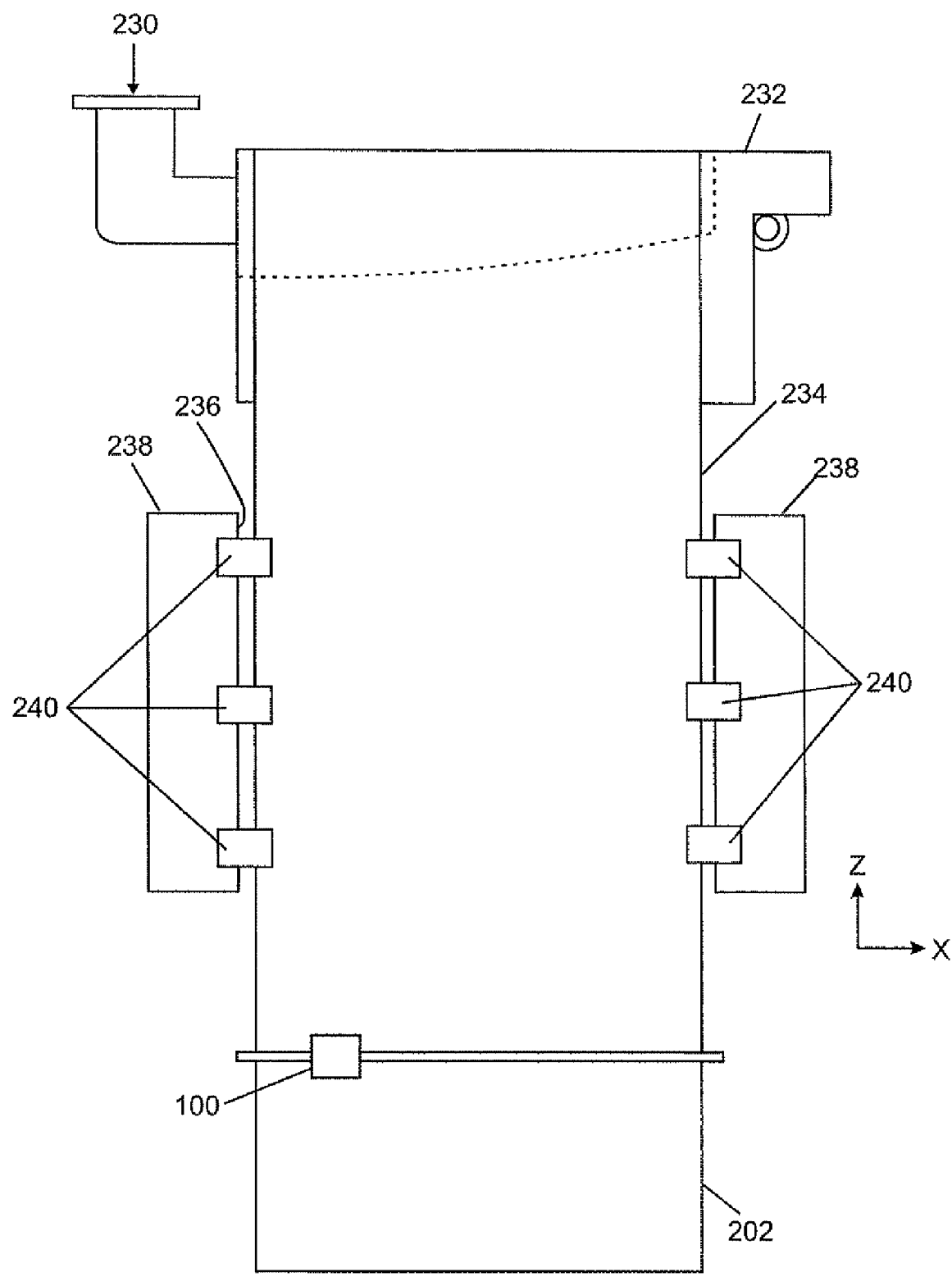
FIG. 8 depicts a glass-sheet manufacturing process.

FIG. 8 illustrates a fusion draw process which may include a no-bend sheet separation process. In the example illustrated in FIG. 8, molten glass or other viscous material 230 flows into a fusion pipe 232 and overflows down the sides of the fusion pipe 232 to form a sheet-like flow 234, which is received in a channel 236. The channel 236 is defined by a pair of elongated guide members 238 arranged in parallel. The channel 236 may be vertical or may have other orientation, for example, horizontal or inclined. Rollers 240 arranged along the guide members 238 grip the side edges of the sheet-like flow 234 and draw the sheet-like flow 234 into a sheet of material 202. The fusion pipe 232, guide members 238, rollers 240, and channel 236 may be a part of a fusion draw machine. Apparatus 100 may be provided at the bottom of the channel 236 to aid in separation of the sheet 202. Details of apparatus 100 are as described above. For measuring a profile of sheet 202 at a desired location, an arrangement such as described in FIG. 6 may be used at the desired location.

The method and apparatus described above allow measurement of positions on a sheet in real time. The optical-based measurement does not make any physical contact with the sheet and therefore has no impact on production processes, such as sheet forming and finishing. Measurements can be made from a plurality of units distributed along the sheet cross-sectional plane to obtain a cross-sectional profile of the sheet. The apparatus uses a linear beam for position detection and thus is insensitive to vertical sheet shape orientation. The combination of a continuous wave laser diode and a linear detector array can shorten the time needed for the measurement and data acquisition and enable real-time measurement at high speed. The apparatus can be used as part of a dynamic scoring system or no-bend separation system to improve separation yield and repeatability.

We claim:

1. A method for determining a position of a selected area of a sheet of material relative to a reference plane, comprising:

launching a first incident light beam at the selected area of the sheet of material such that the first incident light beam strikes the selected area at a first position and a first angle, thereby producing a first reflected light beam;

launching a second incident light beam at the selected area of the sheet of material such that the second incident light beam strikes the selected area at a second position and a second angle, thereby producing a second reflected light beam, the second position and second angle being different from the first position and first angle, respectively;

intercepting the first reflected light beam and the second reflected light beam at the reference plane;

receiving the first angle and a first information related to a position at which the first reflected light beam was intercepted;

receiving the second angle and a second information related to a position at which the second reflected light beam was intercepted; and correlating the first angle, the second angle, the first information, and the second information to the position of the selected area relative to the reference plane, wherein the correlating comprises resolving $P_n = b(2\theta_n + 2\theta_0)$, where $P_n$ is the location at which the reflected light beams are intercepted on the reference plane, $\theta_n$ is the angle at which the incident light beams strike the selected area, b is the distance from the selected area to the reference plane, and $\theta_0$ is the orientation of the selected area relative to the reference plane.

2. The method of claim 1, further comprising using the information to control a no-bend sheet separation process.

3. The method of claim 1, wherein the absolute value of each of $\theta_n$ and $\theta_0$ is less than approximately 12 degrees.

4. The method of claim 1, wherein the first incident light beam and the second incident light beam are elongated light beams with an aspect ratio of at least 10, and wherein launching the first incident light beam and the second incident light beam comprises aligning a major axis of the first incident light beam and a major axis of the second incident light beam, respectively, in a direction substantially parallel to a translation direction of the sheet of material.

5. The method of claim 1, further comprising generating a light beam and splitting the light beam into the first incident light beam and the second incident light beam.

6. The method of claim 1, further comprising generating a light beam and directing the light beam at a scanning optical mirror to produce the first incident light beam and the second incident light beam.

7. The method of claim 6, wherein the scanning optical mirror is positioned in opposing relation to the selected area and rotates along a translation direction of the sheet of material.

8. The method of claim 1, further comprising generating the first incident light beam with a first light source and the second incident light beam with a second light source.

9. The method of claim 1, wherein intercepting the first reflected light beam and the second reflected light beam comprises intercepting the first reflected light beam with a linear array detector.

10. The method of claim 1, wherein intercepting the first reflected light beam and the second reflected light beam comprises selectively translating a light receiver to intercept the first reflected light beam and the second reflected light beam.

11. The method of claim 1, wherein intercepting the first reflected light beam and the second reflected light beam comprises intercepting the first reflected light beam prior to launching the second incident light beam.

12. An apparatus for determining a position of a selected area of a sheet of material relative to a reference plane, comprising:
a light source for launching a first incident light beam and a second incident light beam at the selected area of the sheet of material at a first angle and a second angle, respectively, said first angle being different from the second angle;
a light receiver for intercepting a first reflected light beam and a second reflected light beam from the selected area of the sheet of material at the reference plane, said first reflected light beam and second reflected light beam traveling in different optical paths;
a data collector for collecting information about positions at which the reflected light beams were intercepted and angles at which the incident light beams were launched; and
a data analyzer configured to receive the first angle and a first information related to a position at which the first reflected light beam was intercepted, to receive the second angle and a second information related to a position at which the second reflected light beam was intercepted, and to determine the position of the selected area relative to the reference plane from the first angle, the second angle, the first information, and the second information, wherein the data analyzer resolves $P_n=b(2\theta_n+2\theta_0)$, where $P_n$ is the location at which the reflected light beams are intercepted on the reference plane, $\theta_n$ is the angle at which the incident light beams strike the selected area, b is the distance from the selected area to the reference plane, and $\theta_0$ is the orientation of the selected area relative to the reference plane.

13. The apparatus of claim 12, wherein the light source comprises a light generator operating at a wavelength ranging from 400 nm to 1700 nm.

14. The apparatus of claim 13, wherein the light source further comprises a scanning optical mirror positioned to receive a light beam from the light generator.

15. The apparatus of claim 13, wherein the light source further comprises a beam shaper for shaping a light beam from the light generator into an elongated light beam.

16. The apparatus of claim 13, wherein the light source further comprises a beam splitter for splitting a light beam from the light generator into the first incident light beam and the second incident light beam.

17. The apparatus of claim 12, wherein the light source includes a first light generator for providing the first incident light beam and a second light generator for providing the second incident light beam.

18. The apparatus of claim 12, wherein the light receiver comprises an array of detectors for intercepting the reflected light beams.

19. The apparatus of claim 12, further comprising at least one narrow band pass filter optically coupled to the light receiver to remove noise from the intercepted reflected light beams.

20. A glass-sheet manufacturing system comprising:
a fusion draw machine for forming a sheet of material; and
an apparatus for determining a position of a selected area of the sheet of material relative to a reference plane, comprising:
a light source for launching a first incident light beam and a second incident light beam at the selected area of the sheet of material at a first angle and a second angle, respectively, said first angle being different from the second angle;
a light receiver for intercepting a first reflected light beam and a second reflected light beam from the selected area of the sheet of material at the reference plane, said first reflected light beam and second reflected light traveling in different optical paths;
a data collector for collecting information about positions at which the reflected light beams were intercepted and angles at which the incident light beams were launched; and
a data analyzer configured to receive the first angle and a first information related to a position at which the first reflected light beam was intercepted, to receive the second angle and a second information related to a position at which the second reflected light beam was intercepted, and to determine the position of the selected area from the first angle, the second angle, the first information, and the second information, wherein the data analyzer resolves $P_n=b(2\theta_n+2\theta_0)$, where $P_n$ is the location at which the reflected light beams are intercepted on the reference plane, $\theta_n$ is the angle at which the incident light beams strike the selected area, b is the distance from the selected area to the reference plane, and $\theta_0$ is the orientation of the selected area relative to the reference plane.

* * * * *